(12) United States Patent
Hirozawa et al.

(10) Patent No.: US 10,906,003 B2
(45) Date of Patent: Feb. 2, 2021

(54) SEPARATION MEMBRANE ELEMENT

(71) Applicant: TORAY INDUSTRIES, INC., Tokyo (JP)

(72) Inventors: Hiroho Hirozawa, Otsu (JP); Keita Wada, Otsu (JP); Kiyoshi Minoura, Otsu (JP); Satoko Morioka, Otsu (JP); Kentaro Takagi, Otsu (JP); Hiroyuki Yamada, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 107 days.

(21) Appl. No.: 16/092,975

(22) PCT Filed: Apr. 24, 2017

(86) PCT No.: PCT/JP2017/016161
§ 371 (c)(1),
(2) Date: Oct. 11, 2018

(87) PCT Pub. No.: WO2017/188176
PCT Pub. Date: Nov. 2, 2017

(65) Prior Publication Data
US 2019/0126207 A1    May 2, 2019

(30) Foreign Application Priority Data

Apr. 27, 2016  (JP) ................................ 2016-088892
Sep. 8, 2016  (JP) ................................ 2016-175319

(51) Int. Cl.
*B01D 63/10* (2006.01)
*C02F 1/44* (2006.01)

(52) U.S. Cl.
CPC ................ *B01D 63/10* (2013.01); *C02F 1/44* (2013.01); *B01D 2313/146* (2013.01)

(58) Field of Classification Search
None
See application file for complete search history.

(56) References Cited

U.S. PATENT DOCUMENTS

2008/0290031 A1    11/2008  Popa et al.
2010/0006504 A1*   1/2010  Odaka .................... B01D 69/10
                                                210/651

(Continued)

FOREIGN PATENT DOCUMENTS

JP     48-52174 U     7/1973
JP     55-124513 A    9/1980

(Continued)

OTHER PUBLICATIONS

International Search Report, issued in PCT/JP2017/016161, PCT/ISA/210, dated Jun. 13, 2017.

(Continued)

*Primary Examiner* — Chester P Barry
(74) *Attorney, Agent, or Firm* — Birch, Stewart, Kolasch & Birch, LLP

(57)    ABSTRACT

The present invention relates to a separation membrane element including: a separation membrane; and a permeate-side channel material disposed on a permeate side of the separation membrane, wherein the permeate-side channel material is a rugged sheet object having a recess and a protrusion on at least one face thereof, the rugged sheet object is composed of a porous region formed of a through-hole in a thickness direction of the rugged sheet and a non-porous region other than the porous region, and a rate of a number of the through-hole in the recess of the rugged sheet object to a total number of the through-hole present in the rugged sheet object is 80% or more.

13 Claims, 3 Drawing Sheets

(56) References Cited

U.S. PATENT DOCUMENTS

2015/0375172 A1* 12/2015 Muehlinghaus ....... B01D 69/02
                                                        210/500.23
2017/0361280 A1    12/2017 Hirozawa et al.

FOREIGN PATENT DOCUMENTS

| JP | 63-151304 A  | 6/1988  |
|----|--------------|---------|
| JP | 1-266816 A   | 10/1989 |
| JP | 7-194945 A   | 8/1995  |
| JP | 2006-247453 A| 9/2006  |
| JP | 2014-64973 A | 4/2014  |

OTHER PUBLICATIONS

Written Opinion of the International Searching Authority, issued in PCT/JP2017/016161, PCT/ISA/237, dated Jun. 13, 2017.
Office Action issued in Chinese Patent Application No. 201780025214.6 dated Sep. 2, 2020.

* cited by examiner

[Fig.1]
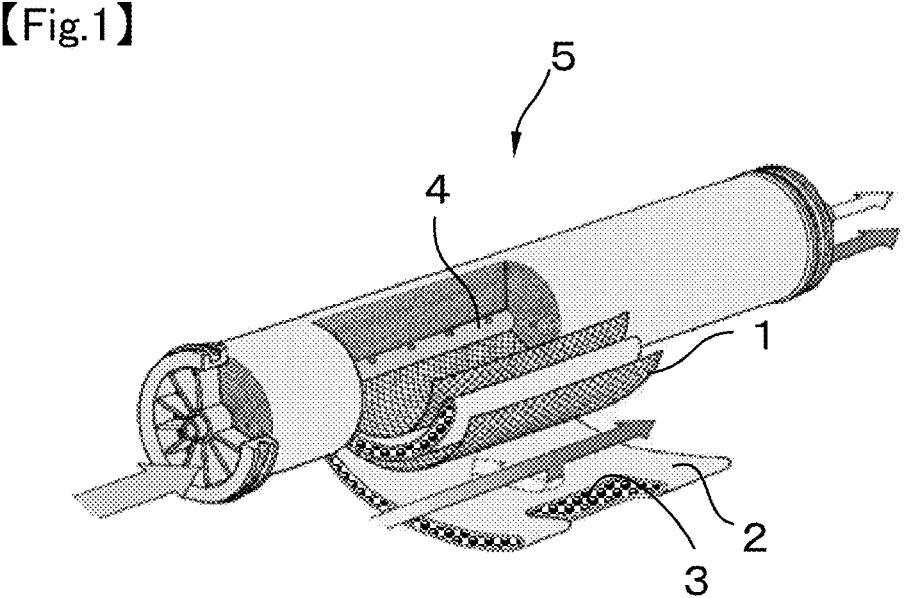
[Fig.2]
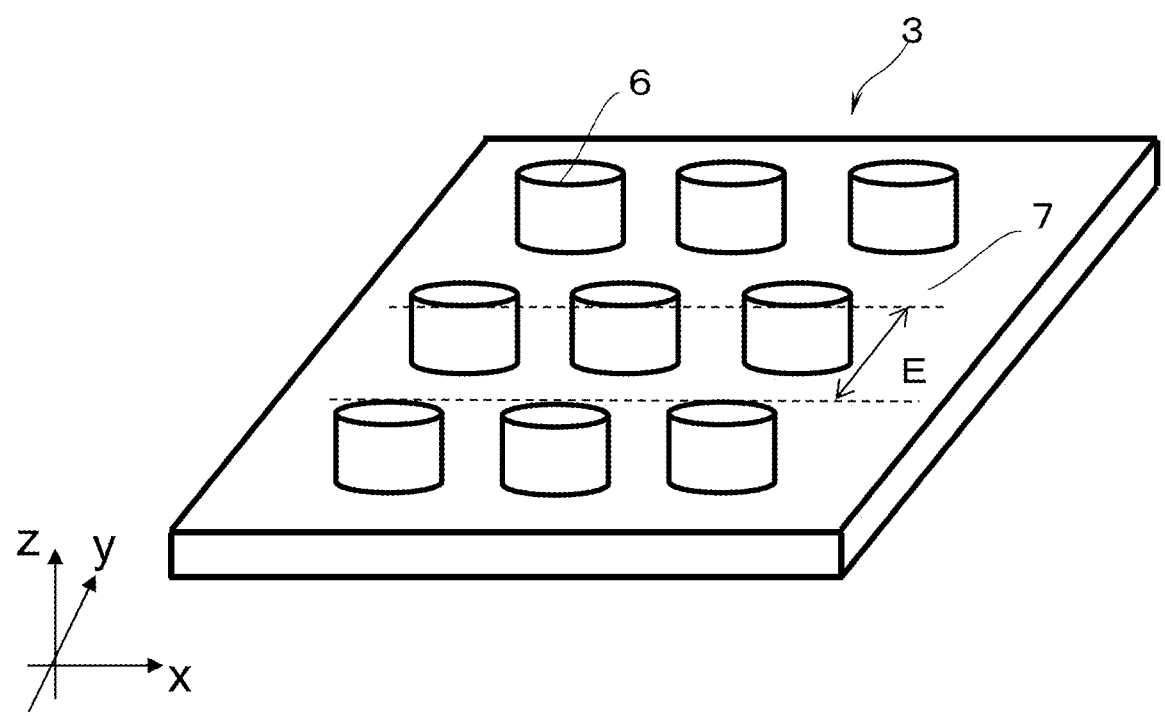

[Fig.3]
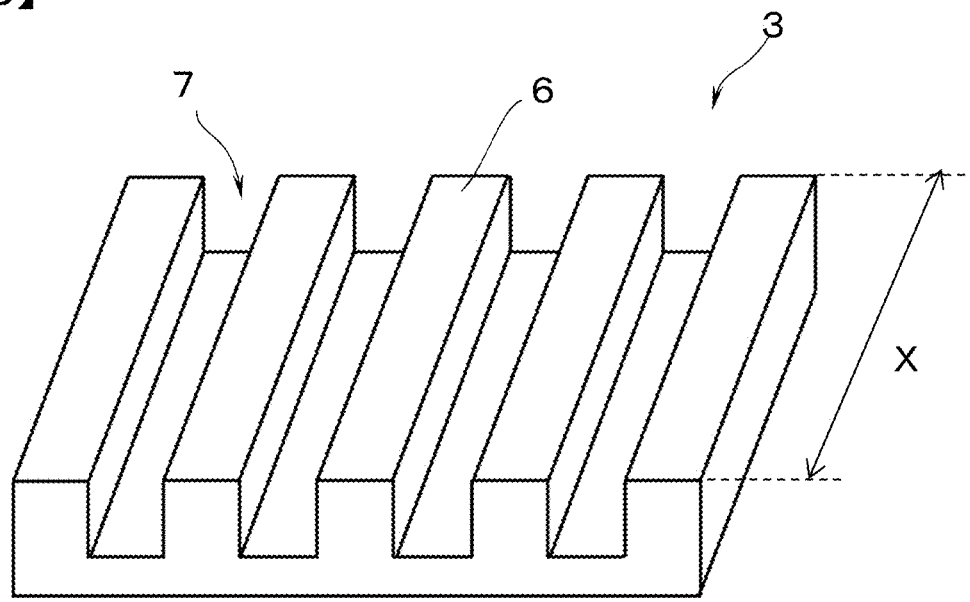
[Fig. 4]
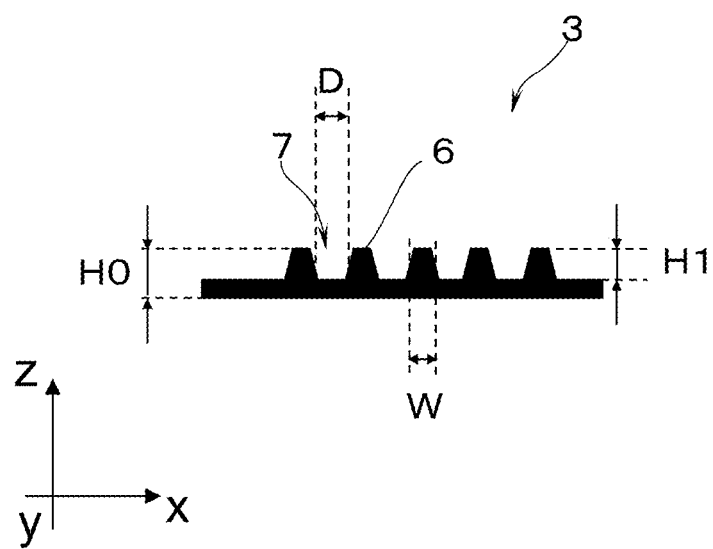

【Fig.5】
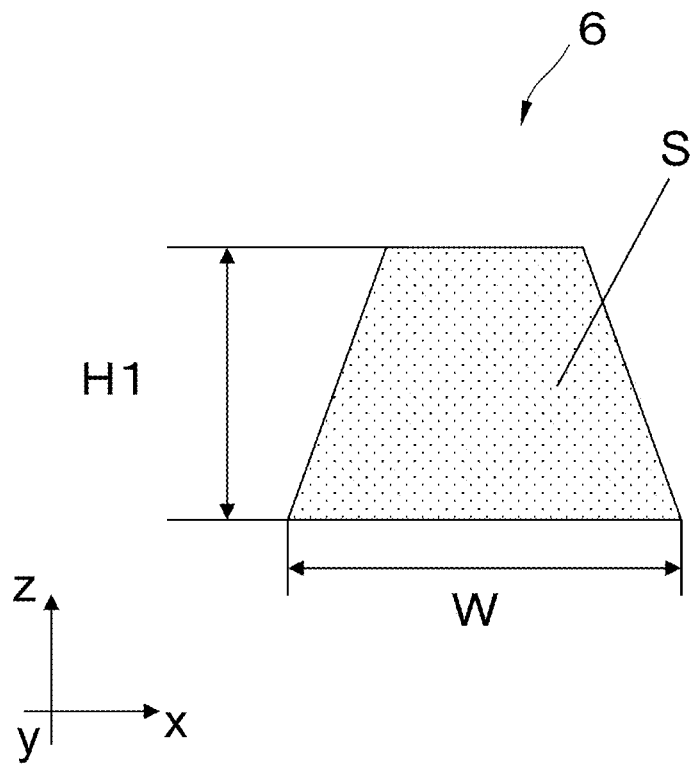
【Fig.6】
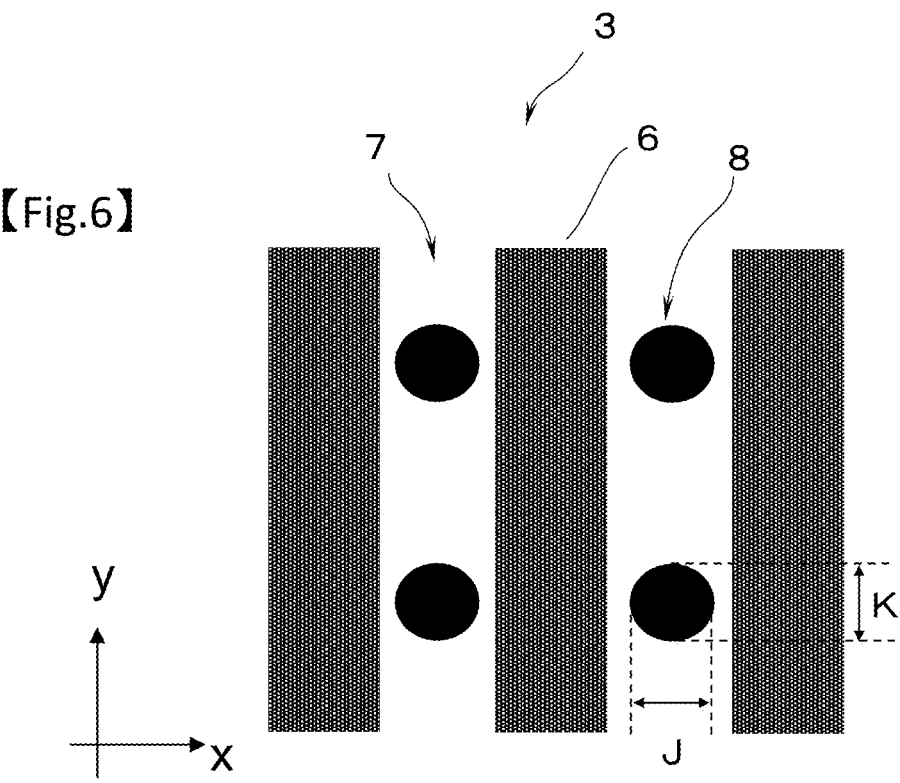

SEPARATION MEMBRANE ELEMENT

TECHNICAL FIELD

The present invention relates to a separation membrane element for use in separation of ingredients contained in fluids such as liquid and gas.

BACKGROUND ART

In the recent technique for removal of ionic substances contained in seawater, brackish water, or the like, separation methods utilizing separation membrane elements have found increasing uses as processes for energy saving and conservation of resources. Separation membranes adopted in the separation methods utilizing separation membrane elements are classified into groups according to their pore sizes and separation performance, namely microfiltration membranes, ultrafiltration membranes, nanofiltration membranes, reverse osmosis membranes, and forward osmosis membranes. These membranes have been used, for example, in production of drinkable water from seawater, brackish water, water containing deleterious substances, or the like, production of ultrapure water for industrial uses, effluent treatment, recovery of valuable substances, or the like, and have been used properly according to ingredients targeted for separation and separation performance requirements.

Separation membrane elements have various shapes, but they are common in that they feed raw water to one surface of a separation membrane and obtain a permeated fluid from the other surface thereof. By having a plurality of separation membranes tied in a bundle, each separation membrane element is configured to extend the membrane area per separation membrane element, in other words, to increase the amount of a permeated fluid obtained per separation membrane element. Various types of shapes, such as a spiral type, a hollow fiber type, a plate-and-frame type, a rotating flat-membrane type, and a flat-membrane integration type, have been proposed for separation membrane elements, according to their uses and purposes.

For example, spiral-type separation membrane elements have been widely used in reverse osmosis filtration. The spiral-type separation membrane element includes a central tube and a stack wound up around the central tube. The stack is formed by staking a feed-side channel material for feeding raw water (that is, water to be treated) to a surface of a separation membrane, a separation membrane for separating ingredients contained in the raw water, and a permeate-side channel material for leading into the central tube a permeate-side fluid having been separated from the feed-side fluid by passing through the separation membrane. In the spiral-type separation membrane element, it is possible to apply pressure to the raw water, and therefore, it has been preferably used in that a large amount of a permeated fluid can be taken out.

In the spiral-type separation membrane element, generally, a net made of a polymer is mainly used as the feed-side channel material in order to form a flow channel for the feed-side fluid. In addition, a multilayer-type separation membrane is used as the separation membrane. The multilayer-type separation membrane is a separation membrane including a separation functional layer formed of a cross-linked polymer such as polyamide, a porous resin layer (porous supporting layer) formed of a polymer such as polysulfone, and a nonwoven fabric substrate made of a polymer such as polyethylene terephthalate, which are stacked from a feed side to a permeate side. Also, as the permeate-side channel material, a knitted fabric member referred to as tricot, which is finer in mesh than the feed-side channel material, has been used for the purposes of preventing the separation membrane from sinking and of forming a permeate-side flow channel.

In recent years, from increased demands for reduction in cost of fresh water production, separation membrane elements having higher performance have been required. For example, in order to improve separation performance of the separation membrane elements and to increase the permeated fluid amount per unit time, improvements in performance of separation membrane element members such as channel members have been proposed.

Specifically, Patent Document 1 proposes a separation membrane element including a channel material including a nonwoven fabric and yarns disposed thereon. Patent Document 2 proposes a separation membrane element for which a general-purpose film is imprinted to form dots or the like and which has the improved property of passing liquids in film-surface directions.

PRIOR ART DOCUMENTS

Patent Documents

Patent Document 1: US 2012/0261333
Patent Document 2: Japanese Patent Laid-open Publication No. 2006-247453

SUMMARY OF THE INVENTION

Problems to be Solved by the Invention

However, in Patent Document 1, since a molten thermoplastic resin is impregnated into and fixed to a sheet having holes on a surface thereof, such as a nonwoven fabric, the manufacturing equipment is large and the process is complicated. In Patent Document 2, since the channel material is nonporous, there is no space in the inside of the channel material, the flow of the passing liquid is consequently limited, and the fresh-water production rate of the obtained separation membrane element is low. An object of the present invention is to provide a separation membrane element packed with a rugged sheet object, the separation membrane element being effective in attaining both stabilization of steps for producing the separation membrane element and an increase in fresh-water production rate.

Solutions to the Problems

To achieve the above object, the present invention provides a separation membrane element including: a separation membrane; and a permeate-side channel material disposed on a permeate side of the separation membrane, wherein the permeate-side channel material is a rugged sheet object having a recess and a protrusion on at least one face thereof, the rugged sheet object is composed of a porous region formed of a through-hole in a thickness direction of the rugged sheet and a non-porous region other than the porous region, and a rate of a number of the through-hole in the recess of the rugged sheet object to a total number of the through-hole present in the rugged sheet object (distribution of the number of the through-hole) is 80% or more.

According to a preferred embodiment of the present invention, a separation membrane element including: a separation membrane; and a permeate-side channel material disposed on a permeate side of the separation membrane, wherein the permeate-side channel material is a rugged sheet object having a recess and a protrusion on at least one face thereof, the rugged sheet object is composed of a porous region formed of a through-hole in a thickness direction of the rugged sheet and a non-porous region other than the porous region, and a rate of an area of the porous region formed of the through-hole in the recess to a total area of the porous region formed of the through-hole in the protrusion and the recess (distribution of the area of the through-hole) is 85% or more, is provided.

In addition, according to a preferred embodiment of the present invention, the separation membrane element in which the recess and the protrusion of the permeate-side channel material are disposed on one face of the permeate-side channel material is provided.

According to a preferred embodiment of the present invention, the separation membrane element wherein a rate of an area of the porous region formed of the through-hole in the recess of the rugged sheet object to an area of the recess in the rugged sheet object is 3% or more and 20% or less, is provided.

In addition, according to a preferred embodiment of the present invention, the separation membrane element in which, in a cross-section of the protrusion which is perpendicular to a longitudinal direction of the protrusion and which passes through a longitudinal-direction center of the protrusion, the protrusion has a ratio of a cross-sectional area to a product of a width and a height of the protrusion of 0.6 or more and 0.99 or less, is provided.

According to a preferred embodiment of the present invention, the separation membrane element wherein the protrusion has a ratio of the cross-sectional area to the product of the width and the height of the protrusion of 0.9 or more and 0.99 or less, is provided.

According to a preferred embodiment of the present invention, the separation membrane element wherein the through-hole has an average hole size of 0.1 mm or more and 0.5 mm or less is provided.

According to a preferred embodiment of the present invention, the separation membrane element wherein the rugged sheet object contains upstretched polypropylene as a main ingredient is provided.

Effects of the Invention

According to the present invention, the fluidity of the permeate in the thickness direction of the rugged sheet object can be improved because the uniformity of the cross-sectional shape of the channel is high, a through-hole is provided to the rugged sheet object, and thus the permeate can be easily guided to the permeate-side channel. Moreover, the resistance in the permeate-side channel can be reduced compared to the rugged sheet object without the through-hole, and the fresh-water production rate of the separation membrane element can be increased because the friction between the permeate and the rugged sheet object in the flow direction is reduced.

BRIEF DESCRIPTION OF THE DRAWINGS

FIG. 1 is a schematic view showing one example of the separation membrane element of the present invention.

FIG. 2 is a slant view showing one example of a permeate-side channel material applicable to the present invention.

FIG. 3 is a slant view showing one example of a permeate-side channel material which provides channels arranged side by side in one direction.

FIG. 4 is a cross-sectional view of an example of a rugged sheet.

FIG. 5 is a cross-sectional view of an example of a protrusion of a rugged sheet.

FIG. 6 is a drawing showing an example of through-holes of a rugged sheet.

EMBODIMENTS OF THE INVENTION

Embodiments of the separation membrane element of the present invention are explained in detail below.

<Outline of the Separation Membrane Element>

Processes for producing the separation membrane element are not limited. As shown in FIG. 1, a feed-side channel material 1 is interposed between separation membranes 2, and a permeate-side channel material 3 is superposed thereon to form a unit, which is spirally wound around a water collection tube 4. Thus, a separation membrane element 5 can be obtained.

In the present invention, the permeate-side channel material 3 that supports the permeate side of the separation membrane to which pressurized raw water is supplied is a shaped rugged sheet object, a protrusion 6 mainly plays a role of supporting the separation membrane, and a recess 7 has many through-holes. Therefore, fluidity of water mainly in a thickness direction can be provided.

The term "shaped" means that the sheet object has been processed so that in cases when the shaped sheet object (rugged sheet object) is sandwiched between separation membranes, channel spaces are formed between the rugged sheet object and each separation membrane. Examples of the shaping include: a method in which a sheet object is deformed and the deformed state is fixed; a method in which a surface of a sheet object is bonded to an object made of the same material or a different material; and a method in which a sheet object is etched. That is, a rugged sheet object can be obtained by shaping a sheet object.

<Rugged Sheet Object Having Through-Hole>

When a rugged sheet object is used as a channel material, in particular, when filtered water (permeate) flows in from the separation membrane from either the front surface or the back surface of the rugged sheet object as in the permeate-side channel material of a spiral type element, the rugged sheet object preferably has a through-hole in the thickness direction of the rugged sheet object. When the rugged sheet object has a through hole in a thickness direction of the rugged sheet object, the permeate can be easily guided to the permeate-side channel and the fluidity of the permeate in the thickness direction of the rugged sheet object can be improved. Moreover, in such a case, the resistance in the permeate-side channel can be reduced compared to the rugged sheet object without the through-hole because the friction between the permeate and the rugged sheet object in the flow direction is reduced. When the resistance in the permeate-side channel is reduced, the pressure loss of the separation membrane element with respect to the operation pressure is reduced. Thus, the effective pressure that is the actual filtration pressure of the separation membrane is improved, and the fresh-water production rate of the separation membrane element can be increased.

<Through-Hole>

As described above, the through-hole facilitates guiding of the permeate to the permeate-side channel and contributes to reduction in resistance in the permeate-side channel. The term "through-hole" refers to a hole in a portion having a hole in a thickness direction in the rugged sheet object in which a space similar to the shape of the hole on the front surface or the shape of the hole on the back surface is formed around the central axis connecting the center of the hole in the front surface and the center of the hole in the back surface.

<Plan-View Shape of Through-Hole>

The plan-view shape of the through-hole is the shape when the through-hole is observed from the front surface or the back surface of the rugged sheet object. The plan-view shape is not particularly limited, but when the through-hole comes into contact with the permeate side of the separation membrane, the separation membrane is likely to sink in the through-hole and deform during pressure filtration. Therefore, it is preferable that the plan-view shape be a circle to make the deformation of the separation membrane uniform and to suppress the mechanical breakdown of the separation membrane due to the deformation.

The plan-view shape of any single through-hole may be different between the front surface and the back surface of the rugged sheet object.

(Length and Width of Through-Hole)

The length K and the width J of the through-hole, that is, the length in the plan-view shape of the through-hole (corresponding to the length direction, that is, the winding direction of the separation membrane element; the maximum value of the size referred to as MD) and the width (the maximum value of the size in the width direction, that is, CD; CD corresponds to the direction orthogonal to the winding direction of the separation membrane element) are preferably 0.01 mm or more and 0.5 mm or less, more preferably 0.05 mm or more and 0.3 mm or less (see FIG. 6) from the viewpoint of improving the fluidity of the permeate in the thickness direction of the rugged sheet object and suppressing the sinking of the separation membrane into the through-hole during pressure filtration.

(Average Hole Size of Through-Holes)

The average hole size of the through-holes can be obtained by observing the through-holes of the rugged sheet object from the rugged surface, measuring the area and the circumferential length of the through-holes, and calculating the hole diameter of the through-holes from 4×area/circumference length, for example, using High-precision configuration analysis system KS-1100, manufactured by Keyence Corp.

For the same reason as for the length and width of the through-hole, the average hole size is preferably 0.01 mm or more and 0.5 mm or less, more preferably 0.05 mm or more and 0.2 mm or less.

(Aspect Ratio of Through-Hole)

The aspect ratio of the through-hole in the plan-view shape is preferably 0.2 or more and 5 or less for the same reason as for the length and width of the through-hole. The aspect ratio is the ratio of the length (MD) to the width (CD) of the through-hole, and can be expressed by length/width.

(Pattern of Through-Holes)

The position where the through-holes are provided in the rugged sheet object can be adjusted so that the effect of the present invention is exhibited. This is because the amount of water to be treated varies depending on the size of the separation membrane element and operating conditions. The larger the amount of water to be treated is, the more the through-holes are required. However, it is unnecessary to provide through-holes uniformly over the entire surface of the rugged sheet object.

As a measure of the pattern of the through-holes, the pressure loss in the planar direction of the rugged sheet object is calculated or measured under conditions of operating the separation membrane element packed with the rugged sheet object, and the size and pitch in the plan-view shape of the through-holes can be determined so that the pressure loss in the through-holes calculated, for example, by Hagen-Poiseuille equation is 5% or less.

However, it is necessary that the rate of the number of through-holes in the recesses of the rugged sheet object to the total number of through-holes present in the rugged sheet object (distribution of the number of through-holes) be 80% or more. This is because the travel distance of water from the separation membrane to the permeate-side channel is shortened and the resistance tends to decrease by providing a large number of through-holes in the recesses of the rugged sheet object, that is, a portion thinner than the protrusions.

When the rate of the area of the porous region formed of the through-holes in the recesses to the total area of the porous region formed of the through-holes in the protrusions and the recesses is 85% or more, fluidity of water in a thickness direction can be provided while the pressure resistance of the protrusions is maintained.

<Planar Portion of Through-Hole>

The planar portion of the through-hole is a portion exposed on the front surface or the back surface of the rugged sheet object. In the planar portion of the through-hole, a raised portion may be present around the through-hole in the planar direction.

<Rigidification of Protrusion>

The protrusion in the rugged sheet object is required to have pressure resistance to support the separation membrane during pressure filtration. To improve the pressure resistance, the shapes of the protrusions in the rugged sheet object (in particular, the boundary regions between the protrusion and the recess) can be individually changed by being partially melted.

<Provision of Through-Holes>

Examples of the method of providing the through-holes to the rugged sheet object include perforation processes such as needle punching and laser processing. Examples of the laser processing include a processing in which a YAG laser, a semiconductor, $CO_2$, an excimer laser, an ultrashort pulsed laser or the like is used.

<Rate of Porous Region in Groove Portion>

The rate of the sum of the area of the porous region formed of the through-holes to the area of the groove portion is preferably 3% or more and 20% or less, more preferably 6% or more and 13% or less from the viewpoint of the flow resistance when the permeate flows into the groove portion from the rugged surface and the increased strength of the rugged sheet object.

<Thickness of the Rugged Sheet Object>

The thickness H0 of the rugged sheet object shown in FIG. 4 is preferably 0.1 mm or more and 1 mm or less. Although film thickness measuring devices of various types, including the electromagnetic type, ultrasonic type, magnetic type, and light transmission type, are commercially available, any non-contact type film thickness measuring device may be used for measuring the thickness of the sheet. A measurement is made on randomly selected ten portions, and an average thereof is used for evaluation. In cases when the thickness of the rugged sheet object is 0.1 mm or larger, this rugged sheet object has the strength required for a permeate-side channel material and can be handled without suffering collapse or breakage of the recess and protrusion even under stress. Meanwhile, in cases when the thickness thereof is 1 mm or less, the number of separation membranes and channel materials that can be inserted into an element can be increased without impairing the windability around a water collection tube.

<Height of Protrusion, Groove Width, and Groove Length of Rugged Sheet Object>

In the rugged sheet object shown in FIG. 4, the height H1 of the protrusion is preferably 0.05 mm or more and 0.8 mm or less, and the groove width D is preferably 0.02 mm or more and 0.8 mm or less. The height of the protrusion and the groove width D can be measured by examining a cross-section of the rugged sheet object with a commercial microscope or the like.

The height of the protrusion, the groove width D, and the space formed between the rugged sheet object and the separation membrane superposed thereon can provide channels. In cases when the height of the protrusion and the groove width D are within those ranges, a reduction in flow resistance can be attained while inhibiting membrane sinking from occurring during pressure filtration. Thus, a separation membrane element which is excellent in terms of pressure resistance and fresh-water production performance can be obtained.

When the protrusions are arranged apart in both MD and CD (see FIG. 2) like dots, the groove length E can be set similarly to the groove width D.

<Width and Length of Protrusion in Rugged Sheet Object>

The width W of the protrusion of the rugged sheet object in FIG. 4 is preferably 0.1 mm or more, more preferably 0.3 mm or more. When the width W is 0.2 mm or more, the shape of the protrusion can be maintained and the permeate-side channel is stably formed even when pressure is applied to a protrusion or a rugged sheet object during operation of the separation membrane element. The width W is preferably 1 mm or less, more preferably 0.7 mm or less. When the width W is 1 mm or less, it is possible to sufficiently ensure the channel on the permeate side of the separation membrane.

The width W of the protrusion is measured as follows. First, in one cross-section perpendicular to a first direction (CD of the separation membrane), an average of the maximum width and the minimum width of one protrusion is calculated. That is, as shown in FIG. 5, in the protrusion whose upper portion is thin and the lower portion is thick, the width of the lower portion and the width of the upper portion of the channel material are measured, and the average thereof is calculated. The average is calculated for at least 30 cross-sections, and the arithmetic average thereof is calculated to obtain the width W of one membrane.

When the protrusions are arranged apart in both MD and CD (see FIG. 2) like dots, the length X can be set similarly to the width W.

<Material of Rugged Sheet Object>

As the form of the sheet object, a knitted fabric, a woven fabric, a porous film, a nonwoven fabric, a net or the like can be used. Especially in the case of a nonwoven fabric, wider spaces serving as channels are formed among the fibers that constitute the nonwoven fabric to facilitate the flow of water, resulting in an improvement in the fresh-water production performance of the separation membrane element. The nonwoven fabric is hence preferable.

The material of the polymer which is the material of the rugged sheet object is not particularly limited as long as it retains the shape as the permeate-side channel material and has little elution of ingredients into the permeate. Examples thereof include synthetic resins such as polyamide resins, e.g., nylons, polyester resins, polyacrylonitrile resins, polyolefin resins, e.g., polyethylene and polypropylene, poly(vinyl chloride) resins, poly(vinylidene chloride) resins, and polyfluoroethylene resins. Especially from the standpoints of strength which makes the rugged sheet object withstand higher pressures and of hydrophilicity, it is preferable to use a polyolefin resin or a polyester resin.

In particular, when protrusions and recesses are formed in a film, a channel material excellent in pressure resistance during pressure filtration can be obtained by using a material containing an unstretched polypropylene film that has a low melting point and low crystallinity and can be relatively easily formed as a main ingredient.

<Channels formed by the Rugged Sheet Object>

After separation membranes are disposed on both faces of the rugged sheet object, the space between a protrusion and an adjacent protrusion can be a channel for permeate. Channels may be ones formed by using a rugged sheet object which itself has been shaped into, for example, a corrugated-sheet shape, a rectangular-wave shape, or a triangular-wave shape, or by using a rugged sheet object in which one face is flat and the other surface has been shaped so as to have recesses and protrusions, or by superposing another member on a surface of a rugged sheet object so as to form a rugged shape on the surface.

<Method for Forming the Rugged Sheet Object>

One method for forming a rugged shape in a surface of a sheet object in order to form channels is imprinting. Imprinting is the following technique. A polymer is heated to or above the glass transition temperature thereof, and a die having a rugged shape and similarly heated to or above the glass transition temperature of the polymer is pressed against the polymer. The die generally is a metallic die to which a rugged shape has been imparted by machining. The polymer and the die in the pressed state are cooled, and the die is then removed from the polymer. Thus, the shape of recesses and protrusions which is the reverse of that in the die is transferred to the polymer surface, i.e., the surface of a sheet object.

By subjecting a sheet object to imprinting, a rugged sheet object having columnar projections formed in a dot arrangement such as that shown in FIG. 2 can be obtained. In the case of a rugged sheet object having dots disposed in a zigzag arrangement, the stress which occurs when pressurized raw water is supplied is dispersed, and this dot arrangement is hence advantageous for inhibiting sinking. Although FIG. 2 shows cylindrical projections each having a circular cross-section (parallel with the plane of the sheet), the cross-sectional shape thereof is not particularly limited and may be a polygonal or elliptic shape, etc. Protrusions differing in cross-sectional shape may coexist. The rugged sheet object may have a rugged shape having continuous grooves in one direction, as shown in FIG. 3.

The protrusion may have a shape such as the shape of a trapezoidal wall-like object, an elliptical cylinder, an elliptical cone, a quadrangular pyramid, or a hemisphere in which the width varies in the cross-sectional shape in the direction perpendicular to the winding direction.

The separation membrane to be used in the present invention can be produced by a known method. The separation membrane thus obtained and the rugged sheet object are disposed so that the rugged sheet object is brought into contact with the back-side face of the separation membrane to support the separation membrane, and are wound up to obtain a separation membrane element.

It is preferable that the sheet object to be used, that is, the rugged sheet object before being shaped, have the same weight as the shaped sheet object does. The sheet object to be shaped is not particularly limited for the width or thickness thereof. However, it is preferred to use a sheet object having a width equal to that of the rugged sheet object and having a thickness more than one-third the thickness of the shaped sheet object (that is, the largest dimension in the thickness direction of the rugged sheet).

The separation membrane to be packed into the separation membrane element may be any separation membrane having separation properties, such as, for example, a reverse osmosis membrane, an ultrafiltration membrane, a microfiltration membrane, or a gas separation membrane.

The shape of the separation membrane element is not particularly limited. However, the rugged sheet object according to the present invention can exhibit the functions thereof especially when used in the spiral type element, which is required to have highly excellent pressure resistance and liquid or gas permeability.

<Cross-Sectional Shape of Protrusion of the Rugged Sheet Object>

FIG. 5 is a cross-sectional view of a protrusion (the cross-section is perpendicular to the plane of the sheet). This cross-section is perpendicular to the longitudinal direction of the protrusion and passes through the longitudinal-direction center of the protrusion. In this cross-section, the ratio of the cross-sectional area S of the protrusion to the product of the width W and the height H1 of the protrusion (cross-sectional area ratio A) is preferably 0.6 or more and 0.99 or less. That is, the cross-sectional area ratio A is represented by A=S/(W×H1), and the ratio A preferably satisfies $0.6 \leq A \leq 0.99$, further preferably satisfies $0.8 \leq A \leq 0.99$, and especially preferably satisfies $0.9 \leq A \leq 0.99$.

The width W is the maximum value of width in the cross-section, and the height H1 is the maximum value of height in the cross-section. Consequently, the example shown in FIG. 4 has a trapezoidal cross-sectional shape; and the maximum value W of width in the cross-section corresponds to the length of the base of the trapezoid, and the maximum value H1 of height corresponds to the height of the trapezoid. Like the example shown in FIG. 4, the protrusions each have a cross-sectional shape in which the width increases in the thickness direction, that is, the cross-section has the largest width at the base W.

That the cross-sectional area ratio A1 is 0.99 or less means that in one cross-sectional shape of the protrusion, the width and/or the height is not constant. That is, in a cross-section of a channel material which satisfies the above-mentioned expression, the periphery thereof includes a portion which declines inward from the periphery of a rectangle in which the length of a side is W and the length of each side perpendicular to the side is h0.

In a channel material having a rectangular cross-sectional shape in which the lengths of the sides are W and H1, the value of A is "1". In this case, the corners of the protrusion have approximately right angles and, hence, may break the separation membrane during operation under pressure to deprive the membrane of the separation properties.

In contrast, the disposition of protrusions which meet the requirement not only enables the rugged sheet object to stably support the separation membrane during operation under pressure but also renders the stress applied to the protrusions even throughout the whole protrusions. The protrusions hence tend to show reduced deformation under the same operation pressure. For this reason, in the cross-section of the protrusion, the ratio of the cross-sectional area S of the protrusion to the product of the width W and the height H1 of the protrusion (cross-sectional area ratio A) is preferably 0.6 or more and 0.99 or less.

EXAMPLES

The present invention is described below in more detail with reference to Examples. However, the present invention should not be construed as being limited by these Examples.

(Thickness of Rugged Sheet Object and Height of Protrusions)

The thickness of the rugged sheet object and the height of the protrusions were measured with High-precision configuration analysis system KS-1100, manufactured by Keyence Corp. Specifically, the High-precision configuration analysis system KS-1100, manufactured by Keyence Corp., was used to examine an area of 5 cm×5 cm, and the results of the examination were analyzed for average height difference. Thirty portions each having a height difference of 10 μm or larger were examined. The height values were summed up, and the sum was divided by the number of all the measurement portions (30 portions). The value thus obtained was taken as the height of the protrusions.

(Width/Length of Protrusions and Groove Width/Groove Length of Recesses of Rugged Sheet Object)

The horizontal distance from the apex of the channel material on the permeate side of the separation membrane to the apex of the adjacent channel material was measured at 200 points using High-precision configuration analysis system KS-1100, manufactured by Keyence Corp., and the average thereof was calculated and taken as the pitch P (see FIG. 4).

(Cross-Sectional Area Ratio of Protrusions)

High-precision configuration analysis system KS-1100, manufactured by Keyence Corp., was used to examine arbitrarily selected protrusions of a rugged sheet object to measure the cross-sectional area of each protrusion, such as that shown in FIG. 5. Subsequently, the proportion of the cross-sectional area to the product of the width and the height of the protrusion, which were measured by the method described above, was calculated. An average of such proportion values for arbitrarily selected 30 portions was taken as the cross-sectional area ratio.

(Distribution of Number of Through-Holes)

With respect to a rugged sheet object having through-holes, the total number of through-holes present in the observed area was measured and the number of through-holes in the recesses of the rugged sheet object was measured using High-precision configuration analysis system KS-1100, manufactured by Keyence Corp. The ratio of the number of through-holes in the recesses of the rugged sheet object to the total number of through-holes present in the rugged sheet object was calculated and taken as the distribution of the number of through-holes.

(Distribution of Area of Through-Holes)

With respect to a rugged sheet object having through-holes, the total area of through-holes present in the observed area was measured and the total area of through-holes in the recesses of the rugged sheet object was measured using High-precision configuration analysis system KS-1100, manufactured by Keyence Corp. "The total area of through-holes in the recesses/the total area of through-holes of the rugged sheet object" was calculated and taken as the distribution of the area of through-holes.

(Average Hole Size of Through-Holes)

The through-hole of the rugged sheet object was observed from the rugged surface, and the area and the circumferential length of the through-hole were measured using High-precision configuration analysis system KS-1100, manufactured by Keyence Corp. Then, the hole diameter of the through-hole was calculated from 4×area/circumference length. This procedure was repeated 100 times in total for arbitrarily selected through-holes and the average hole size of the through-holes was calculated from E (hole diameters of through-holes)/100.

(Rate of Porous Region in Groove Portion)

The through-holes of the rugged sheet object were observed from the rugged surface, and the ratio, in an arbitrarily selected groove portion, of the area of the groove portion (including the through-holes) at the measurement portion to the total area of the 50 adjacent through-holes was calculated using High-precision configuration analysis system KS-1100, manufactured by Keyence Corp. This procedure was also carried out for other 99 grooves, and the average thereof was taken as the rate of porous region in the groove portion.

(Pitch of Through-Holes)

The through-holes of a rugged sheet object were observed from the rugged surface, and the center-to-center distance between arbitrarily selected adjacent through-holes in MD was measured at 20 points, and the pitch of the through-holes was calculated from Σ (center-to-center distances between arbitrarily selected adjacent through-holes)/20 using High-precision configuration analysis system KS-1100, manufactured by Keyence Corp.

(Aspect Ratio of Through-Hole)

The length (MD) and the width (CD) of the through-hole were measured and the length/width was calculated using High-precision configuration analysis system KS-1100, manufactured by Keyence Corp. This procedure was repeated for arbitrarily selected through-holes at 30 points and the aspect ratio of the through-hole was calculated from Σ (length/width)/30 (see FIG. 6).

(Fresh-Water Production Rate A)

A separation membrane element was operated for 15 minutes using an aqueous NaCl solution having a concentration of 3.5 wt % and a pH of 6.5 as feed water under the conditions of an operation pressure of 4.1 MPa and a temperature of 25° C. (recovery, 15%). Thereafter, sampling was performed for 1 minute. The amount (gallons) of the water obtained as a permeate per unit area of the membrane per day was expressed as the fresh-water production rate A (gallons/day (GPD)).

(Removal Ratio A (TDS Removal Ratio A))

The raw water used and the permeate sampled in the 1-minute operation for determining the fresh-water production rate A were examined for TDS concentration by conductivity measurement. The TDS removal ratio was calculated using the following equation.

TDS removal ratio (%)=100×{1−(TDS concentration in permeate)/(TDS concentration in raw water)}

(Fresh-Water Production Rate B)

The separation membrane element after the measurement of fresh-water production rate A was operated for 30 minutes using an aqueous NaCl solution having a concentration of 3.5 wt % and a pH of 6.5 as feed water under the conditions of an operation pressure of 10 MPa and a temperature of 25° C. Thereafter, the fresh-water production rate measured under the conditions of the fresh-water production rate A was expressed as the fresh-water production rate B.

(Removal Ratio B (TDS Removal Ratio B))

The raw water used and the permeate sampled in the 1-minute operation for determining the fresh-water production rate B were examined for TDS concentration by conductivity measurement. The TDS removal ratio was calculated using the following equation.

TDS removal ratio (%)=100×{1−(TDS concentration in permeate)/(TDS concentration in raw water)}

(Production of Rugged Sheet Object Having Through-Holes)

Imprinting and $CO_2$ laser processing were applied to an unstretched polypropylene film (TORAYFAN manufactured by TORAY INDUSTRIES, INC.) to obtain a rugged sheet object having through-holes. Specifically, the unstretched polypropylene film was interposed between metallic dies in which grooves had been formed by machining. This stack was kept being pressed at 15 MPa at 140° C. for 2 minutes and cooled at 40° C. Thereafter, the film was removed from the dies.

Subsequently, recesses in the rugged film were laser-processed from the non-rugged surface of the protrusion and recess imprinting sheet using a 3D-Axis $CO_2$ Laser Marker MLZ9500 to obtain through-holes. In Examples 1 to 8, the through-holes were provided in each groove at a pitch of 2 mm, and in Example 9, the through-holes were provided in the middle of CD of each protrusion.

Example 1

A 15.2% by mass DMF solution of a polysulfone was cast in a thickness of 180 μm on a nonwoven fabric made of poly(ethylene terephthalate) fibers (fiber diameter, 1 dtex; thickness, about 0.09 mm; density, 0.80 g/cm$^3$) at room temperature (25° C.). Immediately thereafter, the fabric was immersed in pure water, allowed to stand therein for 5 minutes, and then immersed in 80° C. hot water for 1 minute, thereby producing a porous supporting layer (thickness, 0.13 mm) constituted of a fiber-reinforced polysulfone supporting membrane.

Thereafter, a roll of the porous supporting layer was unwound, and immersed in an aqueous solution containing 3.8% by weight m-PDA for 2 minutes. Then, the supporting membrane was slowly pulled up in the vertical direction. Then, nitrogen was blown from an air nozzle against the membrane to remove the excess aqueous solution therefrom. Thereafter, an n-decane solution containing 0.175% by weight trimesoyl chloride was applied thereto so that the surface was completely wetted thereby. This coated membrane was allowed to stand still for 1 minute. The membrane was then vertically held for 1 minute in order to remove the excess solution therefrom. Thereafter, the membrane was rinsed with 90° C. hot water for 2 minutes, thereby obtaining a separation membrane roll.

The separation membrane thus obtained was folded and cut so as to result in an effective area in a separation membrane element of 0.5 m$^2$. A net (thickness, 0.5 mm; pitch, 3 mm×3 mm; fiber diameter, 250 μm; projected area ratio, 0.25) was used as a feed-side channel material. Using the cut separation membrane and the net, a leaf having a width of 260 mm and a leaf length of 1,200 mm was produced.

The rugged sheet object shown in Table 1 was interposed as a permeate-side channel material between the permeate-side face portions of the leaf obtained, and the resultant stack was spirally wound around a water collection tube (width, 350 mm; diameter, 18 mm; number of holes, 10 holes linearly arranged in a row) made of ABS (acrylonitrile/butadiene/styrene). A film was further wound around the periphery. After the wound members were fixed with a tape, edge cutting and end plate attachment were performed. Thus, a separation membrane element having a diameter of 2 inches was produced.

The separation membrane element was loaded in a pressure vessel and evaluated for the performances under the conditions shown above. The results obtained are shown in Table 1.

TABLE 1

|  |  | Example 1 | Example 2 | Example 3 | Example 4 | Example 5 | Example 6 |
|---|---|---|---|---|---|---|---|
| Rugged sheet object | Thickness H0 (nm) | 0.26 | 0.26 | 0.26 | 0.26 | 0.26 | 0.26 |
|  | Disposition of recesses and protrusions | one face | one face | both faces | one face | one face | one face |
| Protrusions | Plan-view shape | linear (MD) | linear (MD) | linear (MD) | linear (MD) | linear (MD) | linear (MD) |
|  | Height H1 (nm) | 0.21 | 0.21 | 0.21 | 0.21 | 0.21 | 0.21 |
|  | Width W (nm) | 0.4 | 0.4 | 0.4 | 0.4 | 0.4 | 0.4 |
|  | Length X (nm) | — | — | — | — | — | — |
|  | Cross-sectional area ratio | 0.5 | 0.5 | 0.52 | 0.63 | 0.97 | 0.95 |
| Recesses | Groove width D (nm) | 0.12 | 0.12 | 0.12 | 0.12 | 0.12 | 0.12 |
|  | Groove length E (nm) | — | — | — | — | — | — |
| Through-hole | Width J (nm) | 0.12 | 0.12 | 0.12 | 0.12 | 0.12 | 0.12 |
|  | Length K (nm) | 0.16 | 0.16 | 0.16 | 0.16 | 0.16 | 0.16 |
|  | Average hole size (nm) | 0.14 | 0.14 | 0.14 | 0.14 | 0.14 | 0.14 |
|  | Ratio of porous region in groove portion (%) | 6 | 6 | 6 | 6 | 6 | 6 |
|  | Aspect ratio | 1.3 | 1.3 | 1.3 | 1.3 | 1.3 | 1.3 |
|  | Distribution of number of through-holes | 80 | 96 | 85 | 82 | 96 | 98 |
|  | Distribution of area of through-hole | 85 | 98 | 91 | 88 | 99 | 99 |
| Performance | Fresh-water production rate A (GPD) | 54.2 | 54.8 | 54.4 | 55.3 | 55.3 | 55.9 |
|  | Removal ratio A (%) | 99.4 | 99.4 | 99.4 | 99.4 | 99.4 | 99.4 |
|  | Fresh-water production rate B (GPD) | 52.7 | 52.7 | 52.8 | 53.7 | 54.1 | 54.1 |
|  | Removal ratio B (%) | 96.2 | 96.2 | 96.0 | 96.7 | 96.7 | 96.7 |

Examples 2 to 18

Separation membranes and separation membrane elements were produced in completely the same manner as in Example 1, except that the rugged sheet object was replaced as shown in Tables 1 to 3.

The separation membrane element was loaded in a pressure vessel and evaluated for the performances under the conditions shown above. The results obtained are shown in Tables 1 to 3.

TABLE 2

|  |  | Example 7 | Example 8 | Example 9 | Example 10 | Example 11 | Example 12 |
|---|---|---|---|---|---|---|---|
| Rugged sheet object | Thickness H0 (nm) | 0.26 | 0.26 | 0.26 | 0.26 | 0.26 | 0.26 |
|  | Disposition of recesses and protrusions | one face | one face | one face | one face | one face | one face |
| Protrusions | Plan-view shape | linear (MD) | linear (MD) | linear (MD) | linear (MD) | linear (MD) | linear (MD) |
|  | Height H1 (nm) | 0.21 | 0.21 | 0.21 | 0.21 | 0.21 | 0.21 |
|  | Width W (nm) | 0.4 | 0.4 | 0.4 | 0.4 | 0.4 | 0.4 |
|  | Length X (nm) | — | — | — | — | — | — |
|  | Cross-sectional area ratio | 0.95 | 0.93 | 0.99 | 0.85 | 0.80 | 0.70 |
| Recesses | Groove width D (nm) | 0.12 | 0.12 | 0.12 | 0.12 | 0.12 | 0.12 |
|  | Groove length E (nm) | — | — | — | — | — | — |
| Through-hole | Width J (nm) | 0.12 | 0.12 | 0.12 | 0.12 | 0.12 | 0.12 |
|  | Length K (nm) | 0.16 | 0.16 | 0.16 | 0.16 | 0.16 | 0.16 |
|  | Average hole size (nm) | 0.14 | 0.14 | 0.14 | 0.14 | 0.14 | 0.14 |
|  | Ratio of porous region in groove portion (%) | 6 | 6 | 6 | 6 | 6 | 6 |

TABLE 2-continued

|  |  | Example 7 | Example 8 | Example 9 | Example 10 | Example 11 | Example 12 |
|---|---|---|---|---|---|---|---|
|  | Aspect ratio | 1.3 | 1.3 | 1.3 | 1.3 | 1.3 | 1.3 |
|  | Distribution of number of through-holes | 98 | 96 | 96 | 96 | 96 | 96 |
|  | Distribution of area of through-hole | 99 | 98 | 98 | 98 | 98 | 98 |
| Performance | Fresh-water production rate A (GPD) | 55.9 | 56.4 | 56.5 | 55.9 | 55.5 | 54.8 |
|  | Removal ratio A (%) | 99.4 | 99.4 | 99.4 | 99.4 | 99.4 | 99.4 |
|  | Fresh-water production rate B (GPD) | 54.2 | 54.2 | 54.4 | 54.0 | 53.9 | 53.2 |
|  | Removal ratio B (%) | 96.7 | 96.7 | 96.7 | 96.6 | 96.5 | 96.4 |

TABLE 3

|  |  | Example 13 | Example 14 | Example 15 | Example 16 | Example 17 | Example 18 |
|---|---|---|---|---|---|---|---|
| Rugged sheet object | Thickness H0 (nm) | 0.26 | 0.26 | 0.26 | 0.26 | 0.26 | 0.26 |
|  | Disposition of recesses and protrusions | one face | one face | one face | one face | one face | one face |
| Protrusions | Plan-view shape | linear (MD) | linear (MD) | dots | linear (MD) | linear (MD) | linear (MD) |
|  | Height H1 (nm) | 0.21 | 0.21 | 0.21 | 0.21 | 0.21 | 0.21 |
|  | Width W (nm) | 0.4 | 0.4 | 0.4 | 0.4 | 0.4 | 0.4 |
|  | Length X (nm) | — | — | 0.4 | — | — | — |
|  | Cross-sectional area ratio | 0.60 | 0.50 | 0.98 | 0.98 | 0.98 | 0.99 |
| Recesses | Groove width D (nm) | 0.12 | 0.12 | 0.12 | 0.12 | 0.12 | 0.16 |
|  | Groove length E (nm) | — | — | 0.12 | — | — | — |
| Through-hole | Width J (nm) | 0.12 | 0.12 | 0.12 | 0.10 | 0.12 | 0.16 |
|  | Length K (nm) | 0.16 | 0.16 | 0.16 | 0.10 | 0.50 | 1.00 |
|  | Average hole size (nm) | 0.14 | 0.14 | 0.14 | 0.10 | 0.19 | 0.28 |
|  | Ratio of porous region in groove portion (%) | 6 | 6 | 6 | 3 | 12 | 19 |
|  | Aspect ratio | 1.3 | 1.3 | 1.3 | 1.0 | 4.2 | 6.3 |
|  | Distribution of number of through-holes | 96 | 96 | 98 | 98 | 98 | 98 |
|  | Distribution of area of through-hole | 98 | 98 | 99 | 99 | 99 | 99 |
| Performance | Fresh-water production rate A (GPD) | 54.5 | 53.0 | 56.7 | 52.0 | 57.0 | 57.5 |
|  | Removal ratio A (%) | 99.4 | 99.4 | 99.4 | 99.5 | 99.4 | 99.4 |
|  | Fresh-water production rate B (GPD) | 53.0 | 51.5 | 53.1 | 50.2 | 53.2 | 53.5 |
|  | Removal ratio B (%) | 96.4 | 96.2 | 96.7 | 96.8 | 96.7 | 96.7 |

Comparative Example 1

A separation membrane element was produced in completely the same manner as in Example 1, except that the permeate-side channel material was replaced with tricot having a continuous shape (thickness, 260 μm; groove width, 400 μm; ridge width, 300 μm; groove depth, 105 μm; made of poly(ethylene terephthalate)).

The separation membrane element was loaded in a pressure vessel and evaluated for the performances under the conditions shown above. The results obtained are shown in Table 4. That is, in the case of tricot, the functional layer of the membrane was broken at the time of evaluation of the fresh-water production rate B, and the removal ratio tended to decrease.

Comparative Example 2

A separation membrane element was produced in completely the same manner as in Example 1, except that a sheet having a rugged shape same as that of Example 1 and including a nonwoven fabric and a thermoplastic resin applied thereto was used.

The separation membrane element was loaded in a pressure vessel and evaluated for the performances under the conditions shown above. The results obtained are shown in Table 4. That is, because the nonwoven fabric has a structure having many voids, densification due to compression occurred during pressure filtration and the resistance in the thickness direction was increased, thereby the fresh-water production rate remarkably decreased.

Comparative Example 3

A separation membrane element was produced in completely the same manner as in Example 1 except that the arrangement of the through-holes was changed as shown in Table 3.

The separation membrane element was loaded in a pressure vessel and evaluated for the performances under the conditions shown above. The results obtained are shown in Table 4. That is, because many through-holes were disposed on protrusions, the protrusions deformed during pressure filtration and the resistance in the permeate-side channel increased, thereby the fresh-water production rate decreased.

TABLE 4

| | | Comparative Example 1 | Comparative Example 2 | Comparative Example 3 |
|---|---|---|---|---|
| Rugged sheet object | Thickness H0 (mm) | — | 0.26 | 0.26 |
| | Disposition of recesses and protrusions | — | one face | one face |
| Protrusions | Plan-view shape | — | linear (MD) | linear (MD) |
| | Height H1 (mm) | — | 0.21 | 0.21 |
| | Width W (mm) | — | 0.4 | 0.4 |
| | Length X (mm) | — | — | — |
| | Cross-sectional area ratio | — | 0.5 | 0.93 |
| Recesses | Groove width D (mm) | — | 0.12 | 0.12 |
| | Groove length E (mm) | — | — | — |
| Through-hole | Width J (mm) | — | — | 0.12 |
| | Length K (mm) | — | — | 0.16 |
| | Average hole size (mm) | — | — | 0.14 |
| | Ratio of porous region in groove portion (%) | | | 6 |
| | Aspect ratio | — | — | 1.3 |
| | Distribution of number of through-holes | — | — | 60 |
| | Distribution of area of through-hole | — | — | 71 |
| Performance | Fresh-water production rate A (GPD) | 53.1 | 55.0 | 37.9 |
| | Removal ratio A (%) | 99.4 | 99.3 | 99.4 |
| | Fresh-water production rate B (GPD) | 52.1 | 25.2 | 35.0 |
| | Removal ratio B (%) | 85.0 | 96.5 | 96.7 |

As apparent from the results shown in Tables 1 to 4, the separation membrane elements of Examples 1 to 18 according to the present invention had high removal performance even when operated at a high pressure and were capable of yielding a permeate at a sufficiently high rate. The results show that these separation membrane elements stably had excellent separation performance.

DESCRIPTION OF REFERENCE SIGNS

1: Feed-side channel material
2: Separation membrane
3: Permeate-side channel material
4: Water collection tube
5: Separation membrane element
6: Protrusion
7: Recess
8: Through-hole
A: Cross-sectional area ratio
D: Groove width
E: Groove length
H0: Thickness of rugged sheet object
H1: Height of protrusion of rugged sheet object
J: Width of through-hole
K: Length of through-hole
S: Cross-sectional area of protrusion of rugged sheet object
W: Width of protrusion of rugged sheet object
X: Length of protrusion of rugged sheet object

The invention claimed is:

1. A separation membrane element comprising:
a separation membrane; and
a permeate-side channel material disposed on a permeate side of the separation membrane,
wherein
the permeate-side channel material is a rugged sheet object having recesses and solid protrusions on at least one face thereof,
the rugged sheet object is composed of a porous region formed of through-holes in a thickness direction of the rugged sheet and a non-porous region other than the porous region, and
a rate of a number of the through-holes in the recesses of the rugged sheet object to a total number of the through-holes present in the rugged sheet object (distribution of the number of the through-holes) is 80% or more.

2. The separation membrane element according to claim 1, wherein a rate of an area of the porous region formed of the through-holes in the recesses of the rugged sheet object to an area of the recess in the rugged sheet object is 3% or more and 20% or less.

3. The separation membrane element according to claim 1, wherein the recesses and the protrusions of the permeate-side channel material are disposed on one face of the permeate-side channel material.

4. The separation membrane element according to claim 1, wherein the protrusions are continuously disposed in one direction and have a ratio of a cross-sectional area to a product of a width and a height of the protrusions of 0.6 or more and 0.99 or less in a cross-section perpendicular to a longitudinal direction of the protrusions.

5. The separation membrane element according to claim 4, wherein the protrusions have a ratio of the cross-sectional area to the product of the width and the height of the protrusions of 0.9 or more and 0.99 or less.

6. The separation membrane element according to claim 1, wherein the through-holes have an average hole size of 0.01 mm or more and 0.5 mm or less.

7. The separation membrane element according to claim 1, wherein the rugged sheet object contains unstretched polypropylene as a main ingredient.

8. A separation membrane element comprising:
a separation membrane; and
a permeate-side channel material disposed on a permeate side of the separation membrane, wherein
- the permeate-side channel material is a rugged sheet object having recesses and solid protrusions on at least one face thereof,
- the rugged sheet object is composed of a porous region formed of through-holes in a thickness direction of the rugged sheet and a non-porous region other than the porous region, and
- a rate of an area of the porous region formed of the through-holes in the recesses to a total area of the porous region formed of the through-holes in the protrusions and the recesses (distribution of the area of the through-holes) is 85% or more.

9. The separation membrane element according to claim 8, wherein a rate of an area of the porous region formed of the through-holes in the recesses of the rugged sheet object to an area of the recesses in the rugged sheet object is 3% or more and 20% or less.

10. The separation membrane element according to claim 8, wherein the recesses and the protrusions of the permeate-side channel material are disposed on one face of the permeate-side channel material.

11. The separation membrane element according to claim 8, wherein the protrusions are continuously disposed in one direction and have a ratio of a cross-sectional area to a product of a width and a height of the protrusions of 0.6 or more and 0.99 or less in a cross-section perpendicular to a longitudinal direction of the protrusions.

12. The separation membrane element according to claim 11, wherein the protrusions have a ratio of the cross-sectional area to the product of the width and the height of the protrusions of 0.9 or more and 0.99 or less.

13. The separation membrane element according to claim 8, wherein the through-holes have an average hole size of 0.01 mm or more and 0.5 mm or less.

* * * * *